| United States Patent [19] | [11] 4,016,623 |
|---|---|
| Nixdorf | [45] Apr. 12, 1977 |

[54] WINDSHIELD CLEANING DEVICE FOR MOTOR VEHICLES

[76] Inventor: Hans Willi Nixdorf, 105a Bockumerstrasse, Dusseldorf, Germany

[22] Filed: Nov. 19, 1975

[21] Appl. No.: 633,563

[52] U.S. Cl. .......................... 15/250.03; 15/250.4
[51] Int. Cl.² .................................... B60S 1/46
[58] Field of Search ...... 15/250.01, 250.03, 250.02, 15/250.4, 250.41, 245, 104.91–104.93; 401/23

[56] References Cited

UNITED STATES PATENTS

| 1,919,236 | 7/1933 | Lunsford | 15/250.03 |
| 2,625,700 | 1/1953 | Baldwin | 15/245 X |
| 3,121,901 | 2/1964 | Reynolds | 15/250.03 |
| 3,457,579 | 7/1969 | Shea | 15/245 |
| 3,818,911 | 6/1974 | Fournier | 15/244 R |
| 3,859,689 | 1/1975 | Rouse | 15/250.03 |

FOREIGN PATENTS OR APPLICATIONS

| 2,000,224 | 8/1969 | France | 15/250.4 |

*Primary Examiner*—Peter Feldman

[57] ABSTRACT

A windshield cleaning device for motor vehicles for use in conjunction with a reciprocable wiper blade, having an essentially trough-shaped receptacle with an inner chamber that is open on at least one side for the accommodation of a water-soluble paste or solid cleansing agent and/or detergent concentrate, mounting means projecting from the receptacle at the side facing away from the at least one open side of the inner chamber for the releasable attachment of the device to one side of the wiper blade, and an applicator disposed adjacent a straight edge defining the inner chamber of the receptacle, which receives from the inner chamber the cleansing agent and/or detergent dissolved by water and applies it to the windshield wiped by the wiper blade. The device is so mounted on the wiper blade that the applicator effectively lies upon the windshield when the receptacle and applicator precede the wiper blade in the direction of movement, and is lifted away from the windshield when the wiper blade is moved in the opposite direction.

14 Claims, 6 Drawing Figures

WINDSHIELD CLEANING DEVICE FOR MOTOR VEHICLES

BACKGROUND

The invention relates to cleaning devices, especially to windshield cleaning devices for motor vehicles, which are fastened to a wiper blade of a motor vehicle and move back and forth with the wiper blade.

In a known windshield cleaner a scraper of approximately the length of the wiper blade is pressed against the windshield and mechanically removes or loosens dirt particles and other vision-impairing materials. The loosened or removed materials are pushed aside by the wiper blade bearing the scraper, and the windshield is thus freed of the coarsest dirt. It has furthermore been proposed to remove, by means of a cleansing agent or detergent solution, the dirt or unavoidable oil- and protein-containing films and coatings which together with water form an emulsion, resulting in streaking which interferes with vision.

The inventor has found that the mechanical forces which can be applied in practice to the windshield by means of scrapers mounted on the wiper blade are not sufficient for the removal of dirt particles and films, and that the scraper devices are therefore ineffectual and are also subject to great wear.

THE INVENTION

The principal object of the invention, therefore, is to create an inexpensive and easily manufactured windshield cleaning device having an improved cleaning action. At the same time, a cleansing agent and/or detergent contained in the form of a paste concentrate in a receptacle that is part of the cleaning device and dissolved by water in the event of rain or the use of the windshield washing device is to be applied better and more uniformly to the windshield of the motor vehicle.

Another object of the invention consists in constructing the fastening means for the removable mounting of the cleaning device on the wiper blade such that the windshield cleaning device can be fastened simply and replaceably to each wiper blade.

The windshield cleaning device of the invention, which is used in conjunction with a reciprocated wiper blade, has a trough-like receptacle which has, on at least one side, an opening located preferably in one plane. The cleansing agent and/or detergent concentrate in paste or solid form is inserted into the receptacle during the manufacture thereof. One edge of the opening of the receptacle adjoins an applicator means in the form of a sponge or a series of teeth disposed closely together in the manner of a comb, whose function is to transfer from the receptacle trough to the windshield the cleansing agent or detergent that is dissolved by the rain or by the water from the washer. To the outside of the receptacle trough at least two fastening members are attached whereby the cleaning apparatus is mounted on a wiper blade such that the applicator means effectively bears against the windshield when the receptacle and applicator means are preceding the wiper blade in the direction of movement of the latter, and that the applicator means is lifted away from the windshield when the wiper blade is moving in the opposite direction.

Rainwater or water ejected by the windshield washer, upon entering through the large opening in the receptacle trough, dissolves portions of the cleansing agent and/or detergent contained therein in paste form, and the resulting liquid cleansing agent or detergent solution thus produced is transferred by the capillary action of the applicator means in the form of an absorbent body or comb, from the receptacle trough to the surface of the windshield. If an absorbent body in the nature of a sponge is used as the applicator, it constitutes a detergent storage means which continues to act after the delivery of water is stopped. With the windshield cleaning device constructed in accordance with the invention, it is possible, therefore, even when water is fed to it for only a short time, such as for example when the car is driven through a spray of water or when the windshield washer is operated briefly, for the cleansing agent and/or detergent to be applied to the windshield over substantially the entire length of the wiper blade, enabling the windshield to be cleaned over large areas, and to be covered uniformly with a dirt and oil repellent film produced by the detergent or cleansing agent. This is accomplished without great wear on the surfaces and without damage to the windshield to which the cleansing agent is applied.

To maintain the effectiveness of the applicator means even in the event of great mechanical stress, e.g., under winter conditions, it is recommendable that the applicator means be provided with sufficient stiffness and stability in the area where it contacts the glass. This can be achieved, when an absorbent body is used as the applicator means, by making the absorbent body non-porous at least in that portion thereof which contacts the glass, or by providing it with a non-porous bottom of plastic or rubber-like resilient material. By this means, particles of dirt or grit are prevented from becoming embedded in the area of contact between the applicator means and the windshield. On the other hand, the absorbent body portion above the said bottom, will, by its capillary action, provide for a continuous and uniform delivery of cleansing agent to the said bearing surface or edge, as the case may be.

The fastening means consists preferably of at least two needle-like projections which are formed on the receptacle trough on the side adjacent the wiper blade, and which are made to penetrate into the wiper blade. The receptacle trough located between the wiper blade and the applicator means forms, in the operation of the windshield cleaning device, a lever arm which amplifes the rocking movement of the wiper blade which is produced during its reciprocation by the friction of the wiper blade on the windshield, and transmit it to the applicator means. In this manner the contact surface of the applicator means is firmly laid against the windshield in the one wiping direction (windshield cleaner preceding the wiper blade), permitting a transfer of the cleansing agent to the windshield, and in the opposite wiping direction (wiper blade preceding the cleaner) the windshield cleaner or its applicator means, as the case may be, is lifted away form the windshield.

The invention will be further explained below with the aid of examples of its embodiment which are represented in the drawing, wherein.

Figure 1:
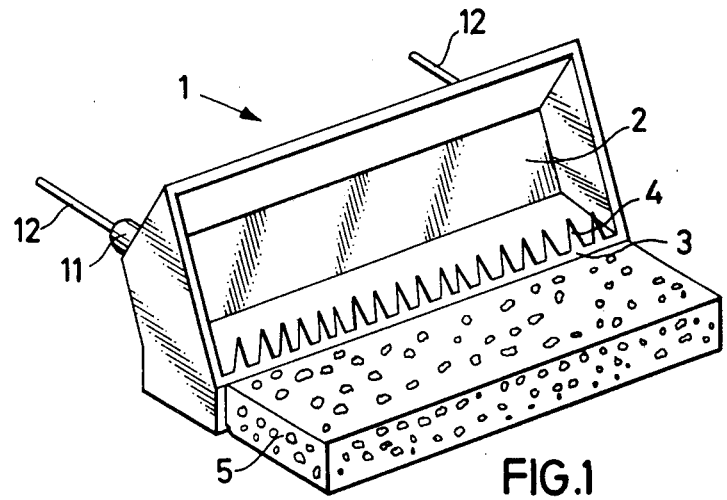
FIG. 1 is a perspective view of an embodiment of the windshield cleaning device.

The windshield cleaning device represented in perspective in FIG. 1 has a receptacle trough 2 in which there is embedded a pasty or solid, water soluble composition consisting of a cleansing agent or detergent concentrate. At the bottom rim 3 of the receptacle trough 2, i.e., the rim adjacent the windshield, there is disposed a comb 4, in the embodiment represented, which prevents the pasty or solid cleansing composition from being washed out, but on the other hand allows the cleansing liquid dissolved from the composition to flow unhampered to an adjacent sponge 5.

On the outer wall 7 of the receptacle trough 2 adjacent the windshield 6 there is formed a holder strip 8 extending in a parallel, spaced relationship to the outer wall 7 over the entire length of the receptacle trough. The sponge 5 is held in the pocket between the outer wall 7 and the holder strip 8 by a gripping action. In the embodiment represented in cross section in FIGS. 2 and 3, a hooked edge 9 is formed on the holder strip 8 adjacent the rim of the pocket as an additional safeguard against the loss of the sponge 5 which projects relatively far out of the pocket.

On an outer wall of the receptacle trough 2 adjacent the wiper blade 10 there are formed the mounting means consisting of the spacers 11 and the pins 12 projecting therefrom, at least two such means being provided as the greatest possible distance apart. To mount the cleaning device, the mounting pins are made to penetrate laterally into the wiper blade rubber. The resilience of the commonly used wiper blade rubber is quite adequate to hold the cleaning device, which is light since it is made virtually entirely from plastic, against the windshield. The pins 12, which are at least two in number, are inserted into the wiper blade rubber preferably within a side groove which is commonly provided therein for engagement by the wiper blade holders, as best seen in FIG. 2.

Figure 4:
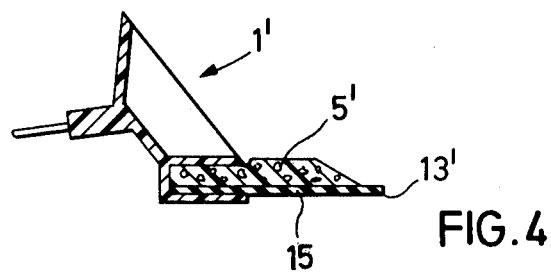
FIG. 4 is a cross-sectional view of the windshield cleaning device in a modified embodiment.

The material of the sponge 5 is selected such that the portion projecting from the mounting pocket, which transfers the cleaning liquid from the receptacle trough 2 to the windshield 6, thus serving as an applicator, will be self-supporting and particularly will not be excessively deformed in the area of its contact with windshield 6. The edge 13 of the sponge, at which the cleaning liquid is applied to the windshield, can be made non-porous by means of a rubber jacket, so as to prevent the entrapment and build-up of particles of dirt or dust in the area of contact with the windshield 6. In FIG. 4 there is shown a slightly modified embodiment 1' of the cleaning device, which differs from the one in FIG. 2 in that the sponge 5' has a rubber bottom 15 whose outer edge 13' projecting beyond the sponge 5' applies to the windshield 6 the cleaning liquid issuing from the sponge 5'. Otherwise, the embodiment of FIG. 4 is the same as those in the previous figures.

Figure 5:
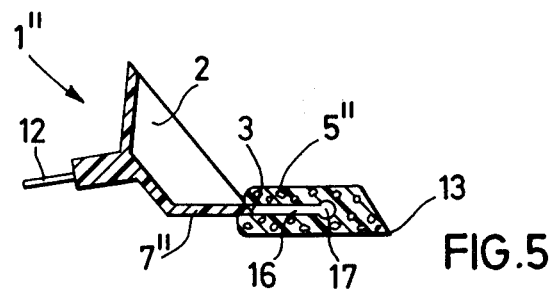
FIG. 5 is a cross-sectional view corresponding to FIG. 4 of another embodiment of the windshield cleaning device.

FIG. 5 shows a windshield cleaner embodiment which is modified with regard to the construction and mounting of the absorbent body 5''. The absorbent body 5'' is pushed over tooth-like mounting means 16 arranged beside one another in a row in prolongation, so to speak, of the wall 7'' of receptacle trough 2 adjacent the windshield 6. The mounting means 16, at least two of which must be provided at the greatest possible distance apart, fix the location of the absorbent body 5'' with respect to the rim of the receptacle trough 2. It is desirable for the upper section of the absorbent body 5'' as shown in FIG. 5 to reach at least up to the rim of the receptacle trough 2, and preferably beyond the edge 3 adjacent the windshield, into the interior of the receptacle trough 2. This arrangement eliminates the need of the comb 4 provided in the above-described embodiments, since the mass of the cleansing concentrate is retained in the trough 2 by the absorbent body 5'' itself. The cleansing and/or clear washing liquid formed by dissolving the concentrate with water can nevertheless be transferred without interference by body 5'' to the applicator surface 13 formed at the edge adjacent the windshield. Enlargements 17 provided at the extremities of the tooth-like mounting means 16 resist the removal therefrom of the absorbent body 5''. The fastening means 12 formed on the back of the trough 2 are the same as those in the previously described embodiments. These fastening means can, of course, also be in the form of clips gripping the wiper blade. However, the fastening means 12 in the form of pins penetrating into the wiper rubber have the advantage over clips that they do not have to be adapted to the cross-sectional shape of the wiper blade and can be used with any wiper blade pattern.

Figure 2:
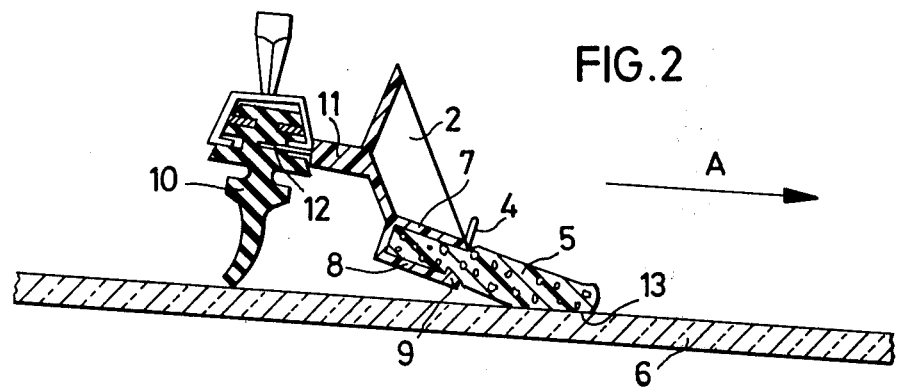
FIG. 2 is a cross-sectional view of the windshield cleaning device of FIG. 1 mounted on the wiper blade, in the phase of movement wherein it is in the active position.
Figure 3:
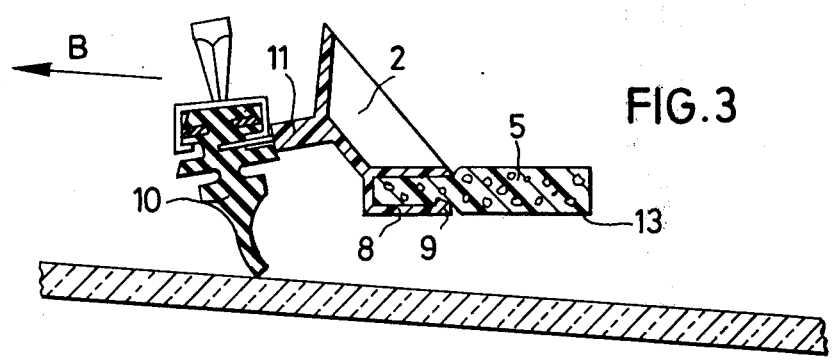
FIG. 3 is a cross-sectional view corresponding to FIG. 2 in the opposite phase of movement of the wiper blade, in which the windshield cleaning device is lifted away from the windshield.

Comparison of FIG. 2 with FIG. 3 will show the manner of operation of the cleaning device, which is fundamentally the same in all of the embodiments described. On account of the friction between the windshield 6 and the bottom edge of the wiper blade 10, the wiper blade is always rocked over by a certain angle from the plane perpendicular to the windshield, depending on the play which its mounting allows. This rocking movement is such, in each phase of the movement, that the wiper blade plane and the imaginary plane of the windshield will always define an acute angle. The windshield cleaning device 1, which is joined to the wiper blade 10 in a virtually rigid manner, is obliged to assume this same angular position relative to the windshield 6. In the one direction of movement marked A in FIG. 2, in which the windshield cleaning device 1 precedes the wiper blade, the contact edge or surface, as the case may be, of the sponge 5 is pressed against the windshield 6 and thus performs its function as an applicator means for the transfer of the cleansing agent and/or detergent to the windshield. In the opposite direction of movement indicated by the arrow B in FIG. 3, the wiper blade 10 is rocked towards the opposite side, thereby lifting the entire cleaning device away from the windshield 6. The application edge 13 is by this movement removed relatively far away from the windshield 6 since it is virtually at the outermost point of the rocking movement. The spacers 11 amplify this lifting movement by increasing the lever arm extending to the applicator means constituted by the sponge 5.

Figure 6:
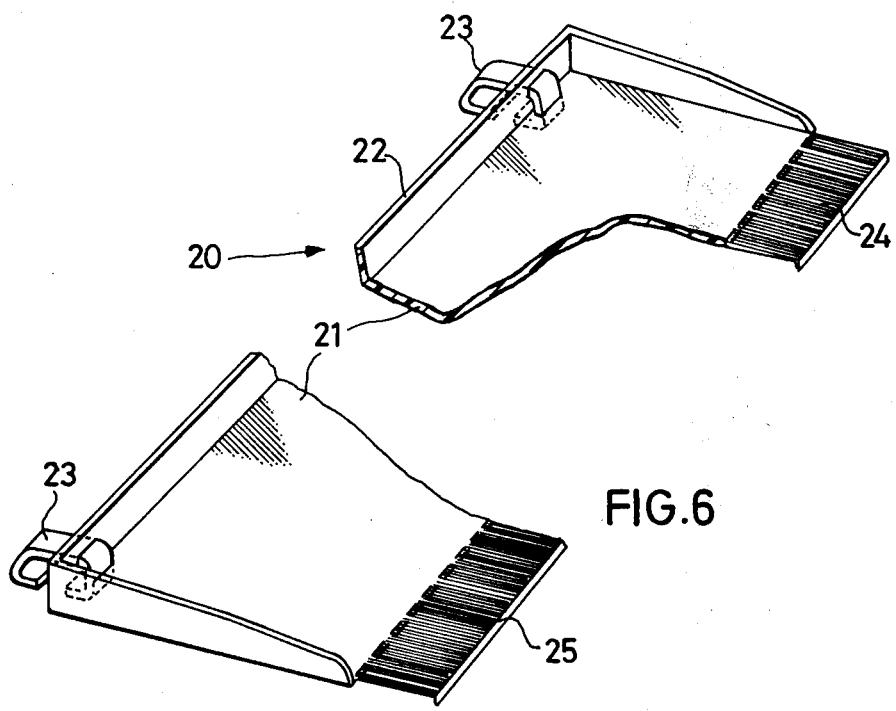
FIG. 6 is a fragmentary view of another embodiment of the invention which has a comb-like row of teeth as the applicator means.

In the embodiment represented in FIG. 6, a shovel-like receptacle is provided for the cleansing agent or detergent. This receptacle has a relatively wide bottom 21 and a relatively narrow back wall 22 at a right angle thereto. From the back wall 22, two mounting clips 23 project outwardly, which can be attached to the back of the wiper blade for the purpose of mounting the cleaning device 20. From the free longitudinal edge of the bottom 21 there extends a comb-like row of teeth 24 which in the working position transfer the dissolved cleansing agent from the shovel-like receptacle to the windshield, which is not shown in the drawing. The application of the cleansing agent to the windshield is performed by a strip 25 projecting downwardly from the extremities of the teeth 24. The row of teeth 24 and the strip 25 are preferably made of plastic in one piece with the receptacle, especially with the bottom 21.

I claim:

1. Windshield cleaning device for use in conjunction with a reciprocable wiper blade of a motor vehicle comprising: an essentially trough-shaped receptacle having wall means defining an inner chamber for the accommodation of cleansing means and having an opening on at least one side in a direction away from the windshield, mounting means projecting from the receptacle at the side facing away from the at least one open side of the inner chamber, for the releasable attachment of the device to one side of the wiper blade, an applicator means disposed adjacent the opening along an outer edge of said wall means defining a space between said applicator means and said wall means to allow water to enter therebetween to contact said cleansing means, which applicator means receives from the inner chamber the cleansing means dissolved by the water and applies it to the windshield wiped by the wiper blade, the device being so mounted on the wiper blade that the applicator means effectively lies upon the windshield when the receptacle and applicator means precede the wiper blade in the direction of movement, and is lifted away from the windshield when the wiper blade is moved in the opposite direction.

2. The windshield cleaning device according to claim 1, wherein said cleansing means is selected from the group consisting of water-soluble pastes, solid cleansing agents, and detergent concentrates.

3. Windshield cleaning device of claim 1, in which the inner chamber of the trough-like receptacle is bounded on the open side by four edges located substantially in an opening plane, the opening plane having an angular attitude to the wiper blade plane bisecting the wiper blade.

4. Windshield cleaning device of claim 1, wherein the applicator means has an absorbent resilient body whose arrangement is such that liquid flowing from the receptacle penetrates into the absorbent body at its upper side and can be applied by its lower side to the windshield in the one direction of movement of the wiper blade.

5. Windshield cleaning device of claim 4, wherein on an outer wall of the receptacle adjacent the windshield there is formed a holding strip which retains the absorbent body and from which the absorbent body projects toward the side facing away from the wiper blade, beyond the edge of the outer wall.

6. Windshield cleaning device of claim 5, which comprises, in the area of the outlet opening between the holding strip and the outer wall, at least one hook-like shoulder which acts against any pulling of the absorbent body out of the grip of the holding strip.

7. Windshield cleaning device of claim 1, which comprises tooth-like holding means projecting away from the wiper blade and from the edge of the receptacle trough wall adjacent the windshield, and a sponge body impaled upon said holding means.

8. Windshield cleaning device of claim 7, which comprises enlargements acting against the release of the sponge body, said enlargements being formed at the outer extremities of the tooth-like holding means and penetrating into the sponge body.

9. Windshield cleaning device of claim 4, wherein the absorbent body is full of pores at least in the area of its contact with the windshield.

10. Windshield cleaning device of claim 4, wherein the absorbent body is provided with a bottom of rubber-elastic material and free of pores.

11. Windshield cleaning device of claim 1, wherein the fastening means consist of at least two needle-like pins disposed in spaced-apart relationship, which are formed on the outside of the receptacle trough adjacent the wiper blade and are stuck into the elastic wiper blade.

12. Windshield cleaning device of claim 11, comprising spacing means disposed between the receptacle trough and the piercing points of the mounting pins, said spacing means amplifying the lifting movement of the device away from the windshield in the opposite direction of movement of the wiper blade, by lengthening the lever arm.

13. Windshield cleaning device of claim 1, in which the applicator means has a comb-like row of teeth, the teeth projecting outwardly from the edge of the wall adjacent the windshield being so close together that they are able to transfer dissolved cleansing means from the receptacle to their extremities which are applicable to the windshield.

14. Windshield cleaning device of claim 13, which comprises a crossbar joining together the tooth extremities, the cleansing means being transferred across the crossbar onto the windshield.

* * * * *